US010929901B2

(12) United States Patent
Rubman et al.

(10) Patent No.: US 10,929,901 B2
(45) Date of Patent: Feb. 23, 2021

(54) SECURE PLATFORM AND DATA REPOSITORY FOR FUR OR SKIN COMMODITIES

(71) Applicant: Furs Ltd., Grand Cayman (KY)

(72) Inventors: Scott Rubman, Buenos Aires (AR); Douglas Graham, East Haven, CT (US)

(73) Assignee: FURS Ltd., Grand Cayman (KY)

( * ) Notice: Subject to any disclaimer, the term of this patent is extended or adjusted under 35 U.S.C. 154(b) by 594 days.

(21) Appl. No.: 15/441,755

(22) Filed: Feb. 24, 2017

(65) Prior Publication Data

US 2017/0243284 A1     Aug. 24, 2017

Related U.S. Application Data

(60) Provisional application No. 62/299,096, filed on Feb. 24, 2016.

(51) Int. Cl.
 *G06Q 30/06*     (2012.01)
 *G06Q 30/08*     (2012.01)
 (Continued)

(52) U.S. Cl.
 CPC ..... *G06Q 30/0601* (2013.01); *G06Q 10/0833* (2013.01); *G06Q 30/08* (2013.01);
 (Continued)

(58) Field of Classification Search
 CPC ............... G06Q 30/0601; G06Q 30/02; G06Q 10/0833; G06Q 10/0875
 (Continued)

(56) References Cited

U.S. PATENT DOCUMENTS 5,707,809 A * 1/1998 Halverson ............ C12Q 1/6879
                                                                                            435/6.11
7,141,364 B1 * 11/2006 Verma ................... C12Q 1/6876
                                                                                            435/6.1
(Continued)

FOREIGN PATENT DOCUMENTS

| CN | 105296648 A | * | 2/2016 | ............... C12Q 1/68 |
| CN | 106096795 | | 11/2016 | |
| KR | 1020080084994 | | 3/2008 | |

OTHER PUBLICATIONS

Perkins Jerry, "Fair board OKs 4-H livestock ID rules; The addition of nose print and DNA tests comes in the wake of disputes at this year's State Fair"; Oct. 22, 2002; Des Moines Register.*

(Continued)

*Primary Examiner* — Yogesh C Garg
(74) *Attorney, Agent, or Firm* — Squire Patton Boggs US LLP (57) ABSTRACT

A method of tracking a provenance of a fur or a leather skin includes providing at least one of a live animal, a fur pelt, and a leather skin, removing a DNA sample from the at least one of the live animal, the fur pelt, and the leather skin, and storing the DNA sample. The DNA sample and DNA information is stored in a DNA repository that may be securely accessed by authorized individuals through a networked device, such as a computer, smart phone, or tablet. The method further includes assigning a globally unique identifier number to the at least one of the live animal, the fur pelt, and the leather skin and storing the identifier number. The method further includes selling the at least one of the live animal, the fur pelt, and the leather skin and storing sale information and associating the sale information with at least one of the identifier number and the DNA sample.

20 Claims, 3 Drawing Sheets

(51) Int. Cl.
*G06Q 50/00* (2012.01)
*G06Q 10/08* (2012.01)
*H04L 29/06* (2006.01)

(52) U.S. Cl.
CPC .......... *G06Q 50/01* (2013.01); *H04L 63/0428* (2013.01); *H04L 63/20* (2013.01)

(58) Field of Classification Search
USPC ....................................................... 705/26.1
See application file for complete search history.

(56) References Cited

U.S. PATENT DOCUMENTS

| | | | |
|---|---|---|---|
| 7,681,527 B2* | 3/2010 | Pratt | A01K 29/00 119/174 |
| 2003/0228604 A1* | 12/2003 | Plastow | C12Q 1/6888 435/6.1 |
| 2004/0048267 A1* | 3/2004 | Rothschild | C07K 14/8107 435/6.11 |
| 2004/0089716 A1 | 5/2004 | Nakamura | |
| 2004/0093501 A1* | 5/2004 | Holcombe | G06F 40/166 713/179 |
| 2005/0051109 A1* | 3/2005 | Fantin | A01K 11/003 119/721 |
| 2006/0000899 A1* | 1/2006 | Bonalle | G06Q 20/40145 235/380 |
| 2006/0123489 A1* | 6/2006 | Schulte | A01K 67/0339 800/8 |
| 2008/0059330 A1 | 3/2008 | Stroman et al. | |
| 2011/0292272 A1* | 12/2011 | Terashima | H04N 5/23212 348/345 |
| 2013/0113622 A1 | 5/2013 | Pratt | |
| 2014/0046698 A1 | 2/2014 | Skocic | |
| 2015/0241572 A1* | 8/2015 | Bowdon | G21K 1/02 378/64 |
| 2016/0180748 A1* | 6/2016 | Le Devehat | G09F 3/0295 235/492 |
| 2017/0169363 A1* | 6/2017 | Salmasi | H04W 4/21 |

OTHER PUBLICATIONS

Written Opinion; Corresponding PCT Application No. PCT/US2017/019348 filed Feb. 4, 2017; Authorized Officer Kim Hyeon Jin; dated Jun. 7, 2017.
International Search Report; Corresponding PCT Application No. PCT/US2017/019348 filed Feb. 4, 2017; Authorized Officer Kim Hyeon Jin; dated Jun. 7, 2017.
Written Opinion; Corresponding PCT Application No. PCT/US2017/047774 filed Aug. 21, 2017; Authorized Officer Lee, Myung Jin; dated Oct. 20, 2017.
International Search Report; Corresponding PCT Application No. PCT/US2017/047774 filed Aug. 21, 2017; Authorized Officer Lee, Myung Jin; dated Oct. 20, 2017.

* cited by examiner

SECURE PLATFORM AND DATA REPOSITORY FOR FUR OR SKIN COMMODITIES

CROSS-REFERENCE TO RELATED APPLICATIONS

The present disclosure claims priority to U.S. Provisional Patent Application No. 62/299,096 filed on Feb. 24, 2016, the entire content of which is incorporated herein by reference in its entirety.

FIELD OF INVENTION

The present disclosure is directed to a platform and data repository for fur or skin commodities (such as leather skins and other hides or skins, including reptile skin and ostrich skin). More particularly, the present disclosure is directed to a platform and repository that provides for the digital identification and the adjudication of the provenance of fur pelts and articles or leather goods.

BACKGROUND

The business-to-business side of the fur industry involves the purchase of fur pelts for the manufacture of garments or other articles. Likewise, the business-to-business side of the leather industry involves the purchase of leather skins for the manufacture of garments or articles. Fur pelts and leather skins are typically available in limited supply from fur farmers, ranchers, or trappers, and may be of varying quality. A purchaser may determine the quality of the pelts or skins through personal inspection, or through verification by a trusted seller or intermediary. Therefore, the business-to-business side of the fur and leather industries is primarily conducted in a face-to-face auction environment on limited occasions. Such auctions require purchasers travel to locations throughout the world to procure raw product. Alternatively, the purchaser may engage an agent or purchase pelts or skins from a broker (or a chain of intermediaries) that purchased the pelts or skins through an auction or a private treaty with particular farmers, ranchers, or trappers. A manufacturer may also purchase pelts or skins directly from a farmer, rancher, or trapper.

The manufacturer then manufactures garments or other articles and may sell the articles to department stores, independent stores, or leased facilities. The manufacturer may sell the articles through a supply chain of distributors. Alternatively, the manufacturer may sell directly to consumers. The consumer can determine the quality and authenticity of the garment through a visual inspection or by trusting the representations of the seller.

SUMMARY OF THE INVENTION

In one embodiment, a platform provides an online marketplace for business-to-business transactions of fur commodities and skin commodities (such as leather skins or other hides or skins, including reptile and ostrich skin). The platform allows ranchers or trappers to sell directly to garment makers or other customers.

A method of tracking a provenance of a fur is also provided. The method can track the provenance of the fur from farming or trapping to the finished garment or accessory, in an actual or virtual store throughout the entire value chain. The method includes providing a live animal, a fur pelt, or leather skin, imaging the live animal, the fur pelt, or the leather skin, and removing or imaging a DNA sample from the live animal, the fur pelt, or leather skin. The method further includes storing at least one of the DNA sample, a DNA image, and information associated with the DNA sample. The DNA sample can be used to identify the original pelt at any point in its subsequent value chain.

The method also includes assigning a globally unique identifier number to the live animal, the fur pelt, or leather skin and storing the identifier number. The use of such identifiers may help prevent fraud and counterfeiting. Verification can be repeated at any point and would involve comparing a sample taken, whether actual or virtual, from a live animal, a pelt, skin, or garment or any part of a future pelt, skin, or garment and comparing it to the stored sample, whether actual or virtual, from the original pelt. The method further includes selling the live animal, the fur pelt or leather skin and storing sale information and associating the sale information with at least one of the identifier number, the DNA sample, and the information associated with the DNA sample.

In another embodiment, a method of tracking a provenance of a fur or a leather skin includes providing at least one of a live animal, a fur pelt, and a leather skin, removing a DNA sample from the at least one of the live animal, the fur pelt, and the leather skin, and storing the DNA sample. The method further includes assigning a globally unique identifier number to the at least one of the live animal, the fur pelt, and the leather skin and storing the identifier number. The method further includes selling the at least one of the live animal, the fur pelt, and the leather skin and storing sale information and associating the sale information with at least one of the identifier number and the DNA sample.

In yet another embodiment, a method of tracking a provenance of a fur or a leather skin includes providing at least one of a live animal, a fur pelt, and a leather skin and imaging the at least one of the live animal, the fur pelt, and the leather skin. The method also includes assigning a globally unique identifier number to the at least one of the live animal, the fur pelt, and the leather skin and storing the identifier number. The method further includes selling the at least one of the live animal, the fur pelt, and the leather skin and storing sale information and associating the sale information with the identifier number.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
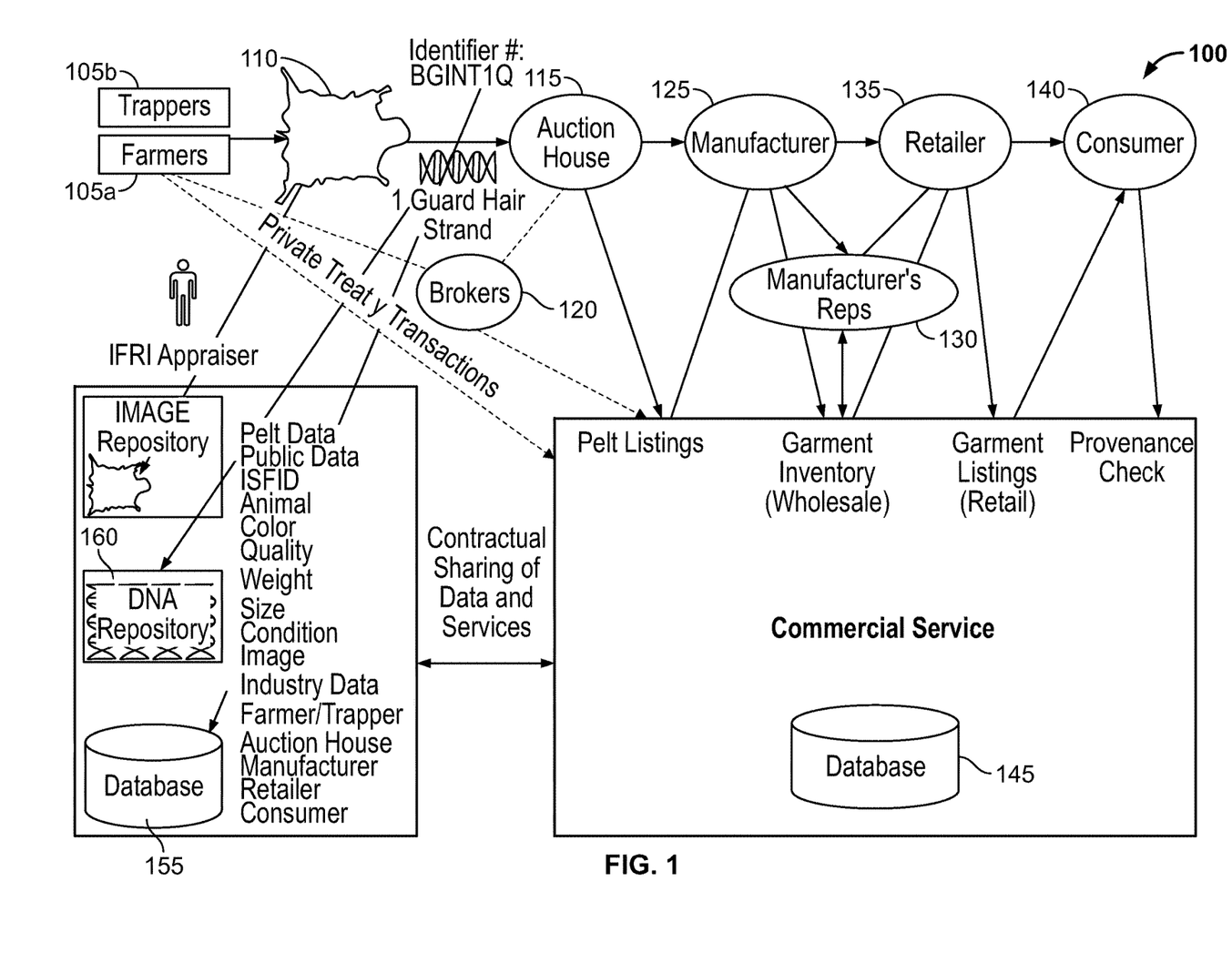
FIG. 1 is a chart showing one embodiment of a distribution path and registry for fur pelts, fur articles, leather skins, and leather goods.

FIG. 1 is a chart illustrating a platform 100 that provides a distribution path and registry for fur pelts, fur articles, leather skins, other hides or skins (such as reptile skin or ostrich skin), and leather or skin goods. The distribution path begins with farmers (or ranchers) 105a and trappers 105b that supply pelts or skins 110. In one embodiment, the farmers 105a and trappers 105b provide the pelts or skins 110 directly to an auction house 115. Alternatively, the farmers 105a and trappers 105b may provide the pelts or skins 110 to a broker 120. The broker 120 in turn provides the pelts or skins to an auction house 115 or a manufacturer 125.

In one embodiment, brokers 120 go to auctions and buy pelts or skins 110 for their own account and hold them for future sale. The broker 120 is not selling or storing on behalf of a principal but rather for themselves, and reaps profits on the buy and future sale. Alternatively, when the farmer or trapper provides the pelts or skins to a broker 120, the farmer or trapper maintains ownership of the pelts or skins, and merely engages the broker 120 to facilitate a sale between the farmer 105a or trapper 105b and a downstream purchaser, such as a garment manufacturer 125.

The farmer, trapper, or broker may then engage an auction house to facilitate a sale with a downstream purchaser, such as the garment manufacturer 125. The auction house may acquire the physical pelts or skins, or the auction house may acquire the rights to auction the pelts or skins while the physical pelts or skins are maintained in a separate location. In either embodiment, the farmer, trapper, or broker retains title to the pelts or skins, or the auction house may acquire title. The auction house then facilitates the sales and the pelts or skins. The pelts or skins may be sold on consignment, and the broker or auction house receives a commission on the sale. In an alternative embodiment, ownership of the pelts or skins may be transferred prior to the auction.

In all cases, the owner of the pelts or skins 110 (whether it is a farmer 105a, a trapper 105b, an auction house 115, or a broker 120) may elect to sell pelts or skins (or facilitate the sale of pelts or skins) as they become available or store the pelts or skins in anticipation of a later sale. For example, the owner of the pelts or skins may wish to sell pelts or skins immediately if the price is at a desirable level, if the owner is in need of capital, or if the owner does not wish to incur storage costs. In another example, the owner of the pelts or skins may opt to store the pelts or skins for later sale if the owner believes that the future supply or demand for pelts or skins would lead to a higher sale price at a later date. In yet another example, the owner may wish to sell (or a buyer wishes to buy) a specific number of pelts or skins of a particular quality or color. In this example the owner may store pelts or skins until the desired number is reached. In such instances, the owner may store the pelts or skins himself or store the pelts or skins at a third party repository.

The farmers 105a and trappers 105b may elect to bundle a plurality of pelts or skins 110 for sale. For example, fur pelts may be sold in bundles of 60, because a fur coat is often manufactured from 60 fur pelts. Alternatively, the pelts or skins may be sold in bundles of 10, 20, 30, or any number of pelts or skins. In one embodiment, an individual farmer 105a or trapper 105b may transfer any number of pelts or skins to a broker 120, and the broker 120 will retain the pelts or skins until a pre-determined number of pelts or skins is reached.

After the auction house 115 acquires the pelts or skins 110 or acquires a right to broker a sale of pelts or skins 110, the auction house 115 may sell the pelts or skins (or facilitate a sale of the pelts or skins) through an in-person auction or through an online auction. An online auction, such as an auction hosted by furs.com, provides a marketable pelt or skin exchange that allows sellers to electronically link with buyers to sell their products at any time, rather than during the limited occasions provided by in-person auctions. In one embodiment, images or videos of the pelts or skins are displayed on an auction website, and bidders have a finite amount of time to place a bid. In an alternative embodiment, the online auction may be a live auction webcast using high definition video. In another alternative embodiment, the live auction may be podcast. The podcast may include images or video of the pelts or skins.

Additionally, the online auction may include images of the pelts or skins and information about the pelts or skins. Information may include, without limitation: an assigned identification number, an animal type, a color, a quality grade, a weight, a condition, a name or identifier associated with the farmer 105a or trapper 105b that supplied the pelt or skin 110, a certification, and a quality grade. The certification may be a licensed certification performed by a third party, such as a government agency or a non-government organization. In other embodiments, the licensed certification may be performed by one or more individuals associated with the auction house, the farmer, or the trapper. In all cases, processes may exist for revoking or cancelling the licensed certification in the event that a garment is stolen, or in the case of mistake or fraud. Disputes related to a certification may be settled through arbitration or mediated with a fur institute or other organization. Alternatively, disputes may be resolved by a government entity. The quality grade may be assigned using a quantitative pelt or skin grading system.

In an online auction system, additional information may be made available to help buyers make their purchasing decisions. For example, a website hosting the online auction may further include reviews from fashion industry experts, video of fur fashion events, and live customer service agents to assist in the selection and purchase of the products.

Figure 2:
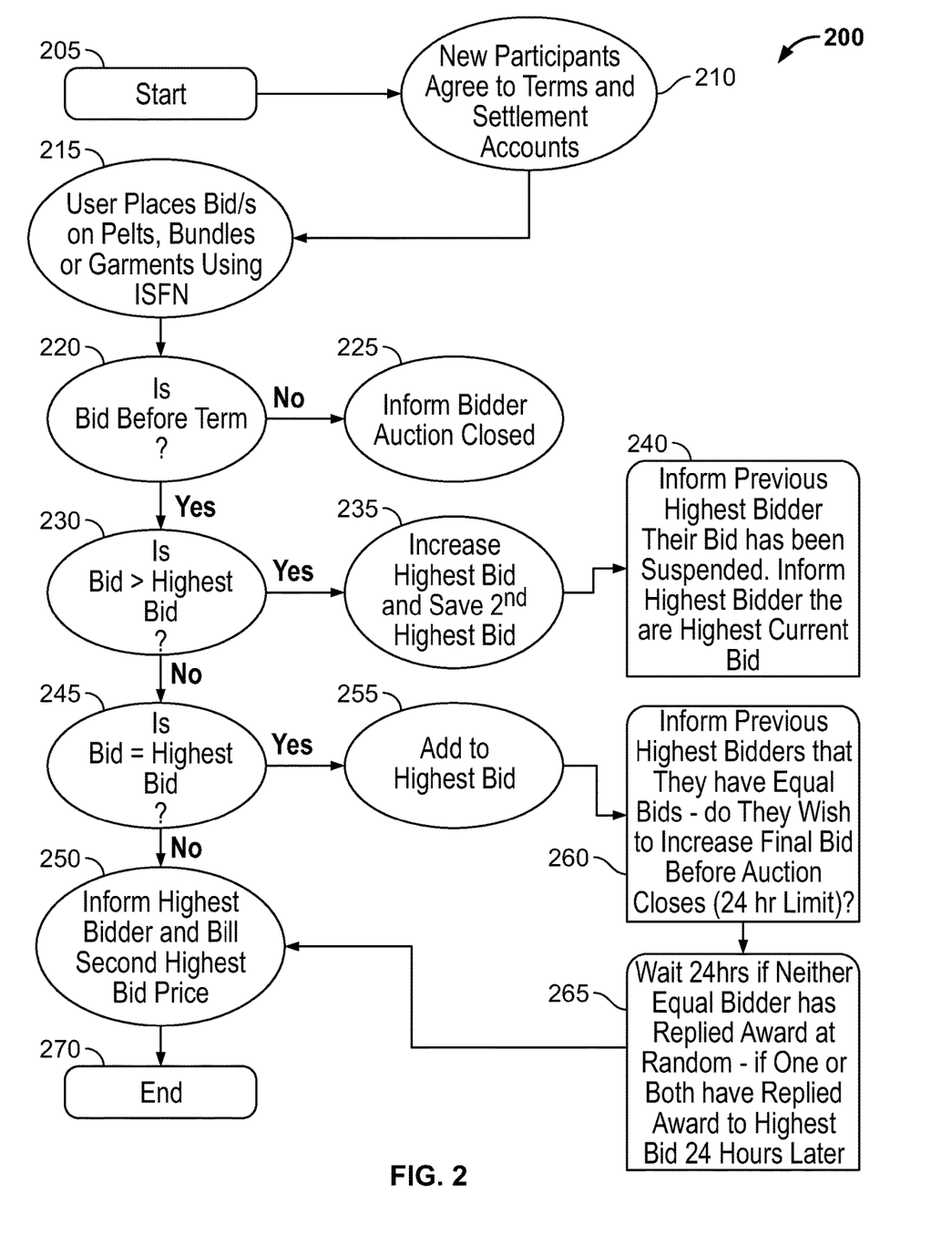
FIG. 2 is a flow chart showing one embodiment of an auction method.

FIG. 2 is a flow chart showing one embodiment of an auction method 200. In the illustrated embodiment, the auction method 200 is a second price algorithm. In one embodiment, the auction method 200 is performed by a computer in an online auction. In an alternative embodiment, the auction method 200 is performed by a human. While certain steps are shown as occurring in a series, it should be understood that the order of steps may be rearranged, or certain steps may occur simultaneously.

At the start 205 of the auction 200, the new participants agree to terms and settlement accounts 210. Each user may place one or more bids on pelts or skins, bundles, or garments using an identification number 215. In an alternative embodiment, the bid may be made without reference to an identification number.

After a new bid is placed, the system determines whether the auction is open 220. If the term of the auction has expired, the bidder is informed that the auction has closed 225. If the auction is still open, the system determines if the new bid is greater than the highest bid 230. If the new bid is greater than the highest bid, the system increases the previous highest bid and saves the second highest bid 235. The system then informs the previous highest bidder that his or her bid has been superseded and informs the new bidder that he or she has the highest current bid 240.

If the new bid is not greater than the highest bid (at 230), the system determines if it is equal to the highest bid 245. If the new bid is not equal to the highest bid, the highest bidder is informed at the end of the auction, and is billed at the second highest bid price 250.

If the new bid is equal to the highest bid, the system adds the new bid to the highest bid 255. The system then informs the highest bidders that they have equal bids, and asks each bidder if they wish to increase their final bids before the auction closes, or within a predetermined time 260. While FIG. 2 shows a predetermined time of 24 hours, it should be understood that any amount of time may be selected.

The system then waits for the predetermined time 265. If neither equal bidder has replied, the item is awarded at random. If one or both of the bidders have increased their bids, the item is awarded to the highest bidder. The highest bidder is informed at the end of the auction, and is billed at the second highest bid price 250. The auction method then ends 270.

While the auction method 200 shown in FIG. 2 is a second price algorithm, it should be understood that a first bid algorithm may be employed. First bid algorithms are more commonly used in existing auction houses.

The results of the auction method 200 may be fed into an artificial intelligence system to track the sales. The sales data can be used to match the supply of pelts or skins to meet demand. For example, the artificial intelligence system may include a predictive engine that predicts future demand based on recent or historical demand.

Referring back to FIG. 1, the auction house 115 typically sells pelts or skins 110 to a manufacturer 125. The manufacturer 125 then manufactures garments or other articles and may supply the articles to a manufacturer's representative 130. Exemplary manufacturer's representatives include wholesalers and distributors. The manufacturer may sell the fur articles to the manufacturer's representatives 130, or may maintain ownership of the fur articles while the manufacturer's representatives facilitate sales to a retailer 140. Exemplary retailers 140 include, without limitation: department stores, independent stores, and leased facilities. The retailer 140 then sells the fur article to a consumer 140.

Alternatively, the manufacturer 125 may sell directly to retailers 135, without using manufacturer's representatives 130. As another alternative, the manufacturer 125 may sell directly to consumers 140.

In addition to illustrating a distribution path for pelts or skins 110, FIG. 1 also shows means by which one or more of the pelts or skins 110 may be appraised or authenticated. In the illustrated embodiment, the appraisal or initial authentication is performed before a farmer 105a or trapper 105b sells or otherwise transfers the pelt or skin 110. However, it should be understood that an appraisal or authentication process may be performed at any time.

The appraisal may be performed by a third party appraiser 150. The appraiser 150 may appraise the pelt or skin 110 by performing a physical inspection of the pelt or skin 110. Alternatively, the appraiser 150 may appraise the pelt or skin 110 by reviewing digital pelt or skin information. A quality grade may be assigned using a quantitative pelt or skin grading system.

Additionally, the pelt or skin 110 may be assigned a globally unique identification number at this time. The identification number may include any combination of alphanumeric characters, or may additionally include non-alphanumeric characters. The identification number may be randomly assigned, or it may include characters related to the farmer 105a, trapper 105b, appraiser 150, or the quality of the pelt or skin 110.

Figure 3:
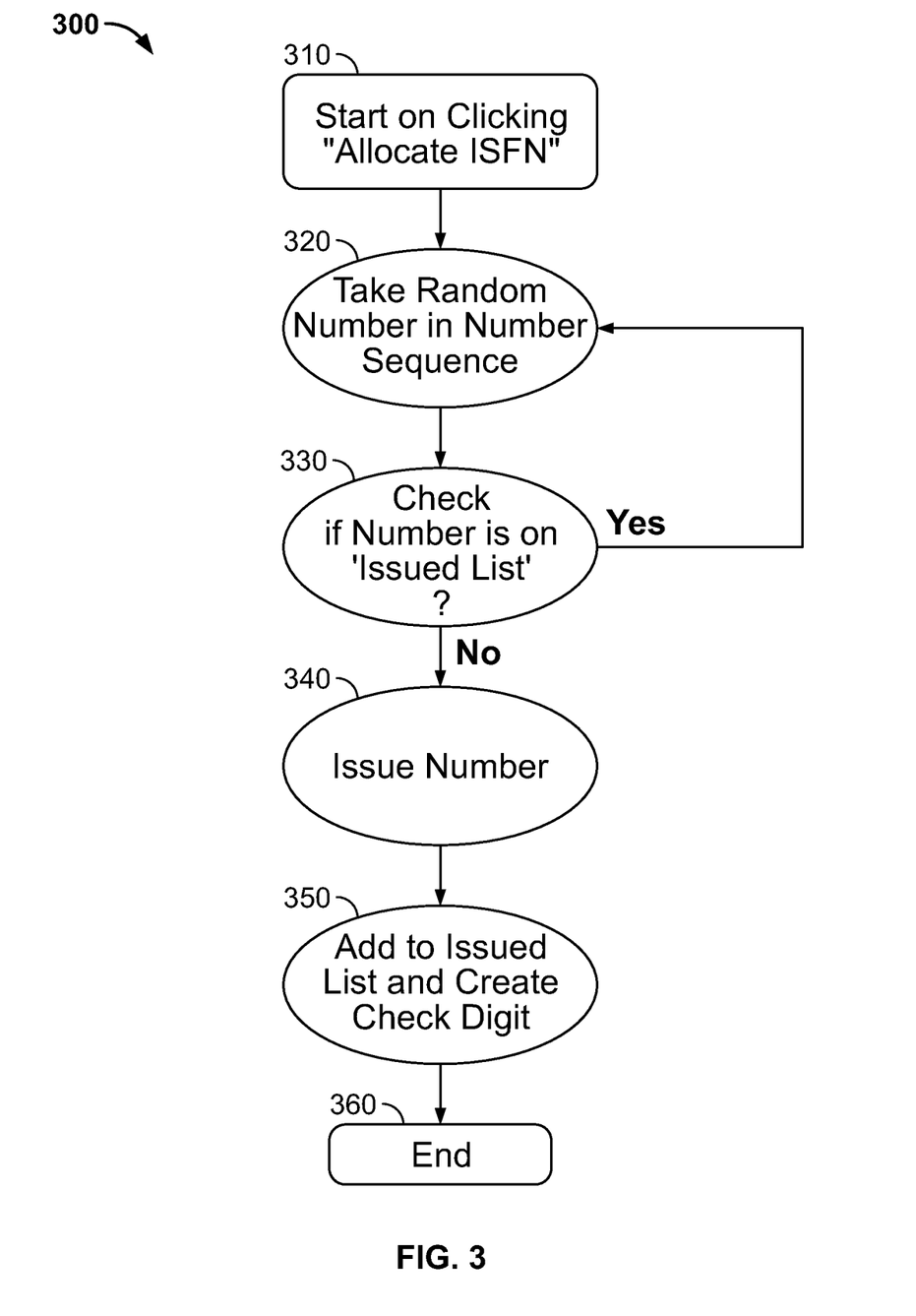
FIG. 3 is a flowchart showing one embodiment of a method of assigning an identification number to a fur pelt or leather skins.

FIG. 3 is a flowchart showing one embodiment of a method 300 of assigning a globally unique identification number to a fur pelt or leather skin 110. The method 300 starts when a user clicks on an icon to allocate an identification number 310. The system then generates a random number in a number sequence 320. The random number may include any combination of alphanumeric characters, or may additionally include non-alphanumeric characters.

After the random number is generated, the system checks if the number is on an issued list 330. If it is on an issued list, the steps of generating a random number 320 and checking the issued list 330 is repeated until a number is selected that is not on the issued list. At that point, the number is issued 340. The number is then added to the issued list and a check digit is created 350. After the check digit is created, the method ends 360.

In one embodiment, the identification number is physically embedded in the pelt or skin 110. For example, the identification number may be printed or sprayed on the pelt or skin 110. Alternatively, the identification number may be associated with an RFID or other electronic device that is embedded in the pelt or skin 110.

Referring back to FIG. 1, the pelt or skin 110 may also be imaged using a scanner or camera (not shown). The image may be a high definition image, and may be a two dimensional or a three dimensional image. The image of the pelt or skin 110 may be stored in a private database 155 for later appraisal or for later comparison to a pelt or skin for authentication purposes. Additional information may also be stored in the private database 155 with the image, or instead of the image. It should be understood, however, that the imaging step is optional in this process. In some embodiments, only information about a pelt is stored. In other alternative embodiments, information and a sample of the pelt is stored.

The information may be stored in the private database 155 at the time the image is stored, or it may be stored in the private database 155 at a later time. For example, additional information may be stored in the private database 155 each time the pelt or skin is transferred to a new owner. Exemplary information includes, without limitation: an identification number, an animal type, a color, a quality grade, a weight, a condition, a name or identifier associated with the farmer 105a or trapper 105b that supplied the pelt or skin 110, a name or identifier associated with an auction house 115 that acquired the pelt or skin 110 (or acquired the right to auction the pelt or skin), a name or identifier associated with a broker 120 that acquired the pelt or skin 110, a name or identifier associated with a manufacturer 125 that acquired the pelt or skin 110, a name or identifier associated with an appraiser 150 that appraised the pelt or skin 110, a name or identifier associated with a manufacturer's representative 130 that acquired the pelt or skin 110, a name or identifier associated with a retailer 135 that acquired the pelt or skin 110, a name or identifier associated with a consumer 140 that acquired the pelt or skin 110, or a name or identifier associated with any other entity that acquired, inspected, appraised, or held the pelt or skin 110.

In addition to imaging the pelt 110, the farmer 105a or trapper 105b may provide a DNA sample from blood, a guard hair, a long hair, or a leather portion (i.e., a tissue sample) of the pelt 110 or a portion of the skin. It should be understood that the DNA sample may be obtained from a live animal or a deceased animal. In the case of a live animal, the DNA may be collected by a blood sample, tissue sample, saliva sample, or hair sample. In one known embodiment, a handheld device is used to remove a tissue sample from a live animal.

The DNA sample may also be provided by another entity at a later stage of the distribution of a pelt or skin. The DNA sample may be mapped or tested on sight, or may be sent to a mapping or testing location. In an alternative embodiment, DNA information about a pelt or skin may be gathered by scanning the pelt or skin. In such an embodiment, it will not be necessary to physically remove hairs or a leather portion from the pelt or skin.

In one embodiment, the DNA sample is provided by removing the guard hair, long hair, or leather portion of the pelt or skin 110. In an alternative embodiment, the DNA sample is provided by scanning an image of the guard hair, long hair, or leather portion of the pelt or skin 110. After the image is scanned, the digital information may be stored. In either embodiment, the DNA sample may be certified through a certification process. The certification may be a licensed certification performed by a third party, such as a government agency or a non-government organization (e.g., a fur institute). In other embodiments, the licensed certification may be performed by one or more individuals associated with the auction house, the farmer, or the trapper. In all cases, processes may exist for revoking or cancelling the licensed certification in the event that a garment is stolen, or in the case of mistake or fraud.

DNA analysis may be performed locally using a processing device. Exemplary processing devices include, without limitation, a desktop computer, a laptop computer, a server, a tablet, a smart phone, a cell phone, or other computerized device. The analysis may be performed using a camera or scanning device that is integral with the processing device, or through an attachment to the processing device that allows the insertion of pelt, skin, or hide hairs. The processing device analyzes the result and stores it in a secure digital environment. Alternatively, the sample may be sent to an outside vendor for analysis.

After the DNA sample is mapped tested, the DNA information may also be stored in the private database 155 with the associated identification number. Additionally, or in the alternative, the DNA sample may be stored in a secure location, such as a DNA repository 160. The DNA repository may be overseen by a trusted third party to maintain security. The DNA sample can be used to identify the original pelt at any point in its subsequent value chain. In all cases, the DNA information may include identification of known diseases or possible diseases that may be associated with a particular gene or gene sequence in the DNA sample.

The data in the DNA repository may be securely accessed by authorized individuals through a networked device, such as a computer, smart phone, or tablet. The data in the DNA repository may be analyzed for a variety of reasons. For example, the DNA samples may be analyzed as part of epidemiological study to determine a genetic basis for disease, defects, or other undesirable characteristic. In some instances, if a gene or sequence of genes is identified as causing a disease or other undesirable characteristic, breeders may use that information to avoid breeding animals that carry the identified gene or gene sequence. Artificial intelligence or an algorithm may be employed to automate analysis and presentation of statistical information regarding defects and disease. Alternatively, the data may be manually analyzed to identify diseases and defects.

Physical security measures may be employed for storing DNA samples. Exemplary physical security includes, without limitation: physical and electronic locks, cameras, lasers, and security guards.

Additionally, digital security measures may be employed for storing an image of the pelt or skin 110 and other information related to the pelt or skin 110. Exemplary digital security measures include, without limitation: spanning tree protocol (STP), homomorphic encryption, Internet key exchange, IPsec, Kerberos, point-to-point protocol, off-the-record messaging, transport layer security, and ZRTP.

Economics may be considered when determining how to treat the DNA sample. At times, it may be more cost effective to map or test a DNA sample and securely store the digital data associated with the map or test. At other times, it may be more cost effective to securely store the physical DNA sample, and only perform DNA mapping or testing if the provenance of a particular pelt or skin is challenged.

As shown in FIG. 1, each sale or transfer of a pelt or skin 110 is recorded in a commercial database 145. Such recordation is performed for both the transfer of an individual pelt or skin, and the transfer of a garment containing the pelt or skin. In this manner, the chain of custody of the pelt or skin may be tracked, and the provenance of the pelt or skin may therefore be verified, thus reducing fraud and counterfeiting. Notably, the provenance of the pelt or skin may be verified at any point along the distribution path. In other words, an auction house 115, broker 120, manufacturer 125, manufacturer representative 130, retailer 135, or consumer 140 may verify the provenance of the pelt, skin, or article by comparing the identification number of a particular pelt or skin on hand with the identification number stored in a database. If any irregularities, such as fraud or counterfeiting, are suspected, then the DNA of the particular pelt or skin on hand can be compared to the DNA in the repository 160. Verification can be repeated at any point and would involve comparing a sample taken, whether actual or virtual, from a pelt, skin, or garment or any part of a future pelt, skin, or garment and comparing it to the stored sample, whether actual or virtual, from the original pelt.

Additionally, or in the alternative, the transfer information or DNA information related to the pelt or skin 110 may be stored in a distributed ledger or blockchain. The distributed ledger may be replicated on tens, hundreds, thousands, or more computers around the world, and may be made publicly available. The distributed ledger employs a consensus mechanism to update the ledger in light of transfers of the pelt or skin 110. The consensus mechanism includes repeatedly feeding the data through a cryptographic "hash" function which boils a block of data down into a string of digits of a given length. This hashing provides an easy means to convert data to a hash, but makes it difficult or even impossible to convert a hash back to the data. Although the hash does not contain the data, it is still unique to the particular data. Any attempt to change the data would therefore change the resulting hash. A changed ledger on one computer (or multiple computers) would be rejected when compared to other computers that maintain copies of the distributed ledger.

In one embodiment, the pelt or skin transfer information or DNA information is stored on a pre-existing distributed ledger. One example of a pre-existing distributed ledger is the blockchain associated with Bitcoin, a digital currency. In an alternative embodiment, the pelt or skin transfer information is stored on a distributed ledger that created for the purpose of identifying pelts or skins.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A method of tracking a provenance of a fur, a leather skin, a reptile skin, or an ostrich skin, the method comprising:
    providing a live animal;
    imaging the live animal;
    removing a first DNA sample from the live animal;
    electronically storing information associated with the first DNA sample in a computer-based system;
    assigning a globally unique identifier number to the live animal;
    electronically storing the identifier number in the computer-based system;
    associating the identifier number with the information associated with the first DNA sample in the computer-based system;
    electronically storing sale information in the computer-based system;
    electronically associating the sale information with the identifier number and the information associated with the first DNA sample in the computer-based system;
    processing the live animal to provide at least one of a fur pelt, a leather skin, a reptile skin, and an ostrich skin;
    removing a second DNA sample from the at least one of the fur pelt, the leather skin, the reptile skin, and the ostrich skin;
    electronically comparing information associated with the second DNA sample to the information associated with the first DNA sample with a processing device, wherein the processing device is selected from the group consisting of a desktop computer, a laptop computer, a server, a tablet, a smart phone, a cell phone, and wherein the processing device includes at least one of a camera and a scanner; and
    electronically verifying the information associated with the second DNA sample matches the information associated with the first DNA sample with the processing device.

2. The method of claim 1, wherein the electronically storing of the information associated with the first DNA sample includes electronically storing information associated with the first DNA sample in a blockchain employing a consensus mechanism.

3. The method of claim 2, wherein the electronically storing the identifier number includes updating the blockchain.

4. The method of claim 2, wherein the electronically storing sale information and electronically associating the sale information includes updating the blockchain.

5. The method of claim 1, wherein the electronically storing of the information associated with the first DNA sample includes electronically storing information associated with the first DNA sample in a database.

6. The method of claim 5, wherein the information associated with the first DNA sample is stored in a database using at least one of spanning tree protocol, homomorphic encryption, Internet key exchange, IPsec, Kerberos, point-to-point protocol, off-the-record messaging, transport layer security, and ZRTP.

7. The method of claim 1, wherein the assigning a globally unique identifier number includes generating a random number in a number sequence and checking if the generated random number is on an issued list.

8. A method of tracking a provenance of a fur, a leather skin, a reptile skin, or an ostrich skin, the method comprising:
    providing a live animal;
    removing a first DNA sample the live animal;
    storing the first DNA sample;
    assigning a globally unique identifier number to the live animal;
    electronically storing the identifier number in a computer-based system;
    associating the identifier number with the information associated with the first DNA sample in the computer-based system;
    electronically storing sale information in the computer-based system;
    electronically associating the sale information with at least one of the identifier number and the first DNA sample in the computer-based system;
    providing at least one of a fur pelt, a leather skin, a reptile skin, and an ostrich skin;
    removing a second DNA sample from the at least one of the fur pelt, the leather skin, the reptile skin, and the ostrich skin;
    electronically comparing information associated with the second DNA sample to the information associated with the first DNA sample with a processing device, wherein the processing device is selected from the group consisting of a desktop computer, a laptop computer, a server, a tablet, a smart phone, a cell phone, and wherein the processing device includes at least one of a camera and a scanner; and
    electronically verifying the information associated with the second DNA sample matches the information associated with the first DNA sample with the processing device.

9. The method of claim 8, further comprising selling the at least one of the fur pelt, the leather skin, the reptile skin, and the ostrich skin through an auction.

10. The method of claim 9, wherein the auction is an online auction.

11. The method of claim 10, wherein the online auction includes displaying images or videos of the at least one of the fur pelt, the leather skin, the reptile skin, and the ostrich skin.

12. The method of claim 10, wherein the online auction includes displaying at least one of an assigned identification number, an animal type, a color, a weight, a condition, a name or identifier, a certification, and a quality grade.

13. The method of claim 9, wherein the auction is run according to a second price algorithm.

14. A method of tracking a provenance of a fur, a leather skin, a reptile skin, or an ostrich skin, the method comprising:

provinding a live animal;

imaging the live animal;

assigning a globally unique identifier number to the live animal;

electronically storing the identifier number in a computer-based system;

associating the identifier number with the image of the live animal;

associating the identifier number with first DNA information;

electronically storing sale information in the computer-based system;

electronically associating the sale information with the identifier number in the computer-based system;

electronically receiving second DNA information associated with at least one of a fur pelt, a leather skin, a reptile skin, and an ostrich skin;

electronically comparing the second DNA information to the first DNA information with a processing device, wherein the processing device is selected from the group consisting of a desktop computer, a laptop computer, a server, a tablet, a smart phone, a cell phone, and wherein the processing device includes at least one of a camera and a scanner; and electronically verifying the second DNA information matches the first DNA information with the processing device.

15. The method of claim 14, further comprising appraising the at least one of the fur pelt, the leather skin, the reptile skin, and the ostrich skin.

16. The method of claim 15, wherein the appraising includes assigning a quality grade using a quantitative pelt or skin grading system.

17. The method of claim 14, further comprising physically embedding the identifier number in the at least one of the fur pelt, the leather skin, the reptile skin, and the ostrich skin.

18. The method of claim 17, wherein the physically embedding the identifier number includes one of printing and spraying the identifier number on the at least one of the fur pelt, the leather skin, the reptile skin, and the ostrich skin.

19. The method of claim 17, wherein the physically embedding the identifier number includes embedding a radio frequency identification device in the at least one of the fur pelt, the leather skin, the reptile skin, and the ostrich skin.

20. The method of claim 14, further comprising storing the image of the live animal.

* * * * *